United States Patent
Takahashi

(10) Patent No.: US 8,706,153 B2
(45) Date of Patent: Apr. 22, 2014

(54) COMMUNICATION DEVICE AND COMMUNICATION SYSTEM

(75) Inventor: Yoshihide Takahashi, Moriguchi (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 234 days.

(21) Appl. No.: 13/259,748

(22) PCT Filed: Apr. 21, 2010

(86) PCT No.: PCT/JP2010/057050
§ 371 (c)(1),
(2), (4) Date: Sep. 23, 2011

(87) PCT Pub. No.: WO2010/123022
PCT Pub. Date: Oct. 28, 2010

(65) Prior Publication Data
US 2012/0021799 A1    Jan. 26, 2012

(30) Foreign Application Priority Data

Apr. 23, 2009  (JP) .................................. 2009-105338

(51) Int. Cl.
*H04B 7/00* (2006.01)
(52) U.S. Cl.
USPC .......... 455/522; 455/69; 455/67.11; 455/500; 455/514; 370/328; 370/329; 370/338; 370/343; 370/350
(58) Field of Classification Search
USPC .......... 455/522, 69, 68, 500, 517, 67.11, 509, 455/515, 550.1, 445, 422.1, 403, 412.1, 455/412.2, 514; 370/310, 328, 329, 338, 370/343, 350
See application file for complete search history.

(56) References Cited

U.S. PATENT DOCUMENTS

| | | | |
|---|---|---|---|
| 5,920,823 A * | 7/1999 | Murai | 455/522 |
| 2006/0003786 A1* | 1/2006 | Furuya | 455/522 |
| 2007/0197253 A1* | 8/2007 | Watanabe et al. | 455/522 |
| 2009/0073927 A1* | 3/2009 | Ishii et al. | 370/329 |

FOREIGN PATENT DOCUMENTS

| | | |
|---|---|---|
| CN | 1486100 A | 3/2004 |
| JP | 05-129981 A | 5/1993 |
| JP | 2002-217844 A | 8/2002 |

OTHER PUBLICATIONS

International Search Report of PCT/JP2010/057050, mailing date Jul. 27, 2010.
Chinese Office Action dated Oct. 10, 2013, issued in corresponding Chinese Patent Application No. 2010800179881, w/ English translation (19 pages).

* cited by examiner

*Primary Examiner* — Keith Ferguson
(74) *Attorney, Agent, or Firm* — Westerman, Hattori, Daniels & Adrian, LLP

(57) ABSTRACT

A communication device is provided with: a transmission power control section that controls the transmission power of a signal, and a transmission state detection section that detects the transmission state of the signal, and transmits the signal wirelessly to a communication partner. The transmission power control section controls the transmission power in accordance with the transmission state that is detected by the transmission state detection section. In this way, optimisation of the transmission power can be implemented with high accuracy.

8 Claims, 3 Drawing Sheets

COMMUNICATION DEVICE AND COMMUNICATION SYSTEM

TECHNICAL FIELD

The present invention is related to a communication device that transmits signals and a communication system provided with the communication device.

BACKGROUND ART

Nowadays, various electronic apparatuses incorporate communication devices that perform wireless transmission and reception of signals. Such communication devices include, for example, one that automatically adjusts and optimizes power of a transmission signal (hereinafter, transmission power).

A description will be given of a configuration of the above-mentioned conventional communication device with reference to FIG. 3. FIG. 3 is a block diagram showing the configuration of parts of the conventional communication device. As shown in FIG. 3, a communication device 100 includes: a modulator 101 for modulating transmission data; a transmission-side amplifier 102 for amplifying a signal modulated by the modulator 101; a transmission-side mixer 103 for mixing a signal of a predetermined frequency with a signal outputted from the transmission-side amplifier 102; a transmission-side oscillator 104 for inputting a signal of a predetermined frequency to the transmission-side mixer 103; a transmission-side band-pass filter (BPF) 105 for filtering out frequency components other than a predetermined frequency component from a signal outputted from the transmission-side mixer 103 to output the resultant signal; an automatic amplifier 106 for amplifying a signal outputted from the transmission-side BPF 105; an antenna BPF 107 for filtering out frequency components other than a predetermined frequency component from a signal inputted from the automatic amplifier 106 or a signal inputted from an antenna 108 (which will be described later) to output the resultant signal; an antenna 108 for wirelessly transmitting a signal (transmission signal) inputted via the antenna BPF 107 from the automatic amplifier 106 and for receiving a signal (reception signal) transmitted from a communication counterpart; a reception-side amplifier 109 for amplifying a signal inputted via the antenna BPF 107 from the antenna 108; a reception-side mixer 110 for mixing a signal of a predetermined frequency with a signal outputted from the reception-side amplifier 109; a reception-side oscillator 111 for inputting a signal of a predetermined frequency to the reception-side mixer 110; a reception-side BPF 112 for filtering out frequency components other than a predetermined frequency component from a signal outputted from the reception-side mixer 110 to output the resulting signal; and a demodulator 113 for demodulating the signal outputted from reception-side BPF 112 to acquire reception data.

The communication device 100 also includes an amplification degree setting portion 114 for setting the degree of amplification performed by the automatic amplifier 106 based on the power of the signal outputted from the reception-side BPF 112 (that is, the power from the reception signal; hereinafter, reception power). The amplification degree setting portion 114 sets the degree of amplification performed by the automatic amplifier 106 based on the reception power, and thereby achieves optimization of the transmission power. That is, the communication device 100, considering the reception signal and the transmission signal to be in the same condition, controls the transmission power based on the reception power.

CITATION LIST

Patent Literature

SUMMARY OF INVENTION

Technical Problem

However, with the conventional communication device 100 described above, if the reception signal and the transmission signal are in different conditions (that is, transmission paths of the signals are in different conditions), it is difficult to optimize the transmission power.

Specifically, for example, assume a case where, although the transmission condition of the communication device 100 (the condition of the transmission path from the communication device 100 to a communication counterpart) is good, the transmission condition of the communication counterpart (the condition of the transmission path from the communication counterpart to the communication device 100) is very bad. In such a case, the automatic amplifier 106 amplifies the transmission signal more than necessary and undesirably increases the transmission power. This not only leads to a problem of unnecessarily large power consumption but also tends to cause a problem of interference to another communication system performing communication by using substantially the same channel (frequency band) as the communication device 100.

Reversely, assume a case where, although the transmission condition of the communication device 100 is very bad, the transmission condition of the communication counterpart is good. In such a case, the automatic amplifier 106 does not amplify the transmission signal very much and undesirably decreases the transmission power. This further worsens the transmission condition of the communication device 100, and may finally cause the communication counterpart to become unable to receive signals, which is inconvenient.

These situations are liable to occur if there exists some difference in condition between transmission and reception, like in a case where different channels are used for transmission and reception. Such difference may naturally occur in the operation of any communication device.

Also, in the case where, as described above, the transmission power is determined based on some parameter such as the reception power, not to mention that it is difficult to achieve optimization, it is necessary to check the relationship between the transmission power and the parameter before shipping. In particular, to improve the accuracy of optimization, it is necessary to assume various cases and perform evaluation tests many times, which is disadvantageously troublesome.

Therefore an object of the present is to provide a communication device capable of accurately optimizing the transmission power and a communication system provided therewith.

Solution to Problem

To achieve the above object, according to one aspect of the present invention, a communication system includes: a first communication device for transmitting a first signal and receiving a second signal; and a second communication device for transmitting the second signal and receiving the first signal. Here, the first communication device includes a first transmission power control portion for controlling first transmission power, which is transmission power of the first signal; the second communication device includes a second condition judging portion for judging condition of the first signal, which the second communication device receives, to generate first transmission power information and a second signal generating portion for generating the second signal which includes the first transmission power information; and the first transmission power control portion acquires the first transmission power information from the second signal, which is received by the first communication device, and controls the first transmission power based on said first transmission power information.

In the descriptions given hereinafter of embodiments of the present invention, transmission and reception signals are dealt with as examples of the first and second signals, an own-side transmission power setting portion and an amplification degree setting portion are dealt with as examples of the transmission power control portions, judgment information and request information are dealt with as examples of the transmission power information, a counterpart-side transmission condition judging portion, a memory, a counterpart-side transmission power requesting portion, and a compound data generating portion are dealt with as examples of the condition judging portions, and a transmission data generating portion, a transmission data combining portion, a modulator, a transmission-side amplifier, a transmission-side mixer, a transmission-side oscillator, a transmission-side BPF, an automatic amplifier, and an antenna BPF are dealt with as examples of the signal generating portions.

According to the present invention, in the communication system configured as described above, it is preferable that the first transmission power control portion adjust the first transmission power based on the condition of the first signal which is transmitted by the first communication device.

With this configuration, it is possible to adjust the first transmission power according to various conditions of the format, the modulation method, etc. of the transmission data included in the first signal. For example, in a case where transmission is expected to be difficult due to, for example, a large data volume, the first transmission power may be set to be sufficiently larger than the minimum necessary magnitude of transmission power calculated based on the first transmission power information (to increase the margin).

According to the present invention, in the communication system configured as described above, it is preferable that the first transmission power information be capable of indicating a request to increase or decrease the first transmission power, and that the first transmission power control portion control the first transmission power according to the request indicated in the first transmission power information. Also, in the communication system configured as described above, it is preferable that the first transmission power control portion control the first transmission power in a predetermined stepwise manner.

This configuration helps achieve a simple control of the first transmission power.

According to the present invention, in the communication system configured as described above, the second condition judging portion may judge condition of the first signal based on an error of the first signal which the second communication device receives. In particular, the second condition judging portion may judge the condition of the first signal based on a BER (bit error rate) of the first signal which the second communication device receives.

This configuration makes it possible for the first communication device to control the first transmission power based on the error of the first signal received by the second communication device. This makes it possible to effectively reduce errors occurring in the first signal received by the second communication device.

According to the present invention, in the communication system configured as described above, the first communication device may further include a memory portion for storing therein the first transmission power information, and the first transmission power control portion may set the first transmission power based on the first transmission power information stored in the memory portion to restart temporarily stopped communication between the first and second communication devices.

With this configuration, it is possible to restart the communication with the first transmission power set to an appropriate magnitude.

Further, according to the present invention, in the communication system configured as described above, at least either in a case where the communication between the first and second communication devices is restarted after it is stopped for a predetermined period of time or longer or in a case where the communication is established, the first transmission power control portion may maximize the first transmission power.

This configuration makes it possible to increase the possibility of the second communication device receiving the first signal.

According to the present invention, in the communication system configured as described above, it is preferable that the first communication device further includes: a first condition judging portion for judging condition of the second signal, which the first communication device receives, and generating second transmission power information, and a first signal generating portion for generating the first signal which includes the second transmission power information, that the second communication device further includes a second transmission power control portion for controlling a second transmission power which is the transmission power of the second signal, and that the second transmission power control portion acquires the second transmission power information from the first signal, which is received by the second communication device, and controls the second transmission power based on said second transmission power information.

In this configuration, not only the first communication device but also the second communication device performs the control of the second transmission power. This makes it possible for the first and second communication devices to securely communicate signals and transmission power information to each other.

According to another aspect of the present invention, a communication device wirelessly transmits a signal to a communication counterpart and includes: a transmission power control portion for controlling transmission power of the signal; and a transmission condition detecting portion for detecting transmission condition of the signal. Here, the transmission power control portion controls the transmission power based on the transmission condition.

Advantageous Effects of Invention

According to the communication system of the present invention, the transmission power of the first communication device is set based on the condition of the first signal. That is, the first transmission power of the first communication device is controlled based on the condition of the transmission path from the first communication device to the second communication device. This makes it possible for the condition of the first signal to be directly fed back to the magnitude of the first transmission power, and thus to accurately optimize the first transmission power. Thus, it is possible to prevent interference to another communication system and to prevent the second communication device from becoming unable to receive signals. Also, according to the communication device of the present invention, it is possible to accurately optimize the transmission power.

DESCRIPTION OF EMBODIMENTS

Figure 1:
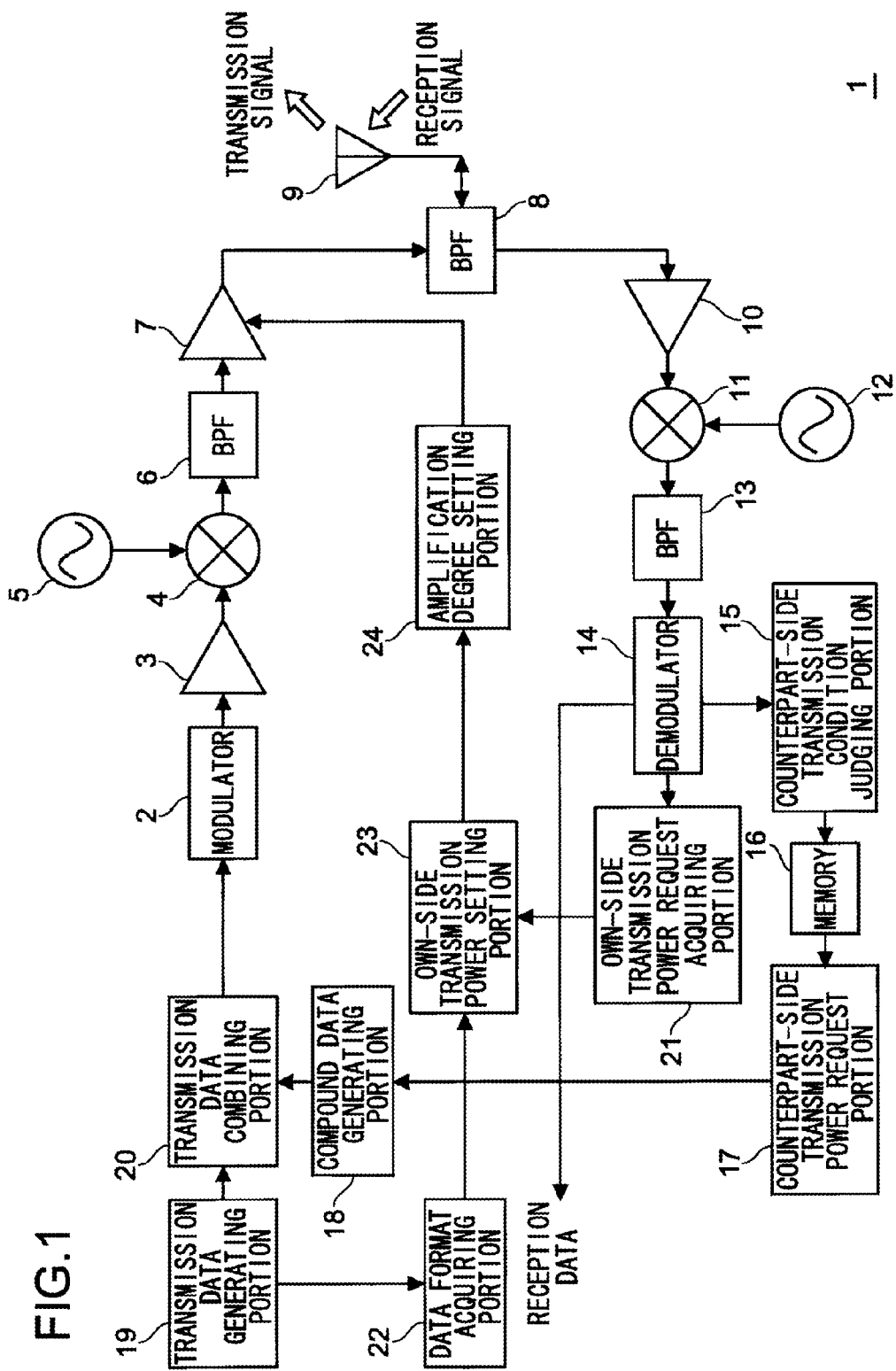
FIG. 1 A block diagram showing the configuration of a communication device embodying the present invention.

First, descriptions will be given of the configuration of a communication device embodying the present invention and how each component operates, with reference to FIG. 1. FIG. 1 is a block diagram showing the configuration of the communication device embodying the present invention. Incidentally, hereinafter, for the sake of specific descriptions, the descriptions hereinafter will deal with a case where the communication device of the present invention is applied to a wireless-transmission television system.

The wireless-transmission television system includes: a display portion that displays images and playbacks audio; and a video source portion that acquires data of moving images or the like by receiving broadcasting or reading out from a recording medium, converts the data into data that can be displayed on the display portion, and wirelessly sends the resulting data to the display portion. The communication device 1 shown in FIG. 1 may be incorporated either in the display portion or in the video source portion, but the description below will deal with a case where the communication device 1 is incorporated in the video source portion.

<Configuration of Communication Device and Operation of Each Component>

As shown in FIG. 1, the communication device 1 includes: a modulation portion 2 that modulates transmission data; a transmission-side amplifier 3 that amplifies a signal modulated by the modulator 2; a transmission-side mixer 4 that mixes a signal of a predetermined frequency with a signal outputted from the transmission-side amplifier 3; a transmission-side oscillator 5 that inputs a signal of a predetermined frequency to the transmission-side mixer 4; a transmission-side BPF 6 that outputs a signal resulting from filtering out frequency components other than a predetermined frequency component from the signal outputted from the transmission-side mixer 4; an automatic amplifier 7 that amplifies a signal outputted from the transmission-side BPF 6; an antenna BPF 8 that outputs a signal resulting from filtering out frequency components other than a predetermined frequency component form a signal inputted from the automatic amplifier 7 and from a signal inputted from an antenna 9 (which will be described later); an antenna 9 that wirelessly transmits a signal (transmission signal) inputted via the antenna BPF 8 from the automatic amplifier 7, and that receives a signal (reception signal) transmitted from a communication counterpart; a reception-side amplifier 10 that amplifies a signal inputted from the antenna 9 via the antenna BPF 8; a reception-side mixer 11 that mixes a signal of a predetermined frequency with the signal outputted from the reception-side amplifier 10; a reception-side oscillator 12 that inputs a signal of a predetermined frequency to the reception-side mixer 11; a reception-side BPF 13 that outputs a signal resulting from filtering out frequency components other than a predetermined frequency component from a signal outputted from the reception-side mixer 11; and a demodulator 14 that demodulates a signal outputted from reception-side BPF 13 to thereby acquire reception data.

The communication device 1 also includes: a counterpart-side transmission condition judging portion 15 that judges the condition of transmission to the communication device 1 from the communication counterpart based on the condition of the reception data acquired by the demodulator 14, and that outputs information of the judgment as judgment information; a memory 16 that stores the judgment information outputted from the counterpart-side transmission condition judging portion 15; a counterpart-side transmission power request portion 17 that generates, based on the judgment information stored in the memory 16, request information indicating request with respect to transmission power of a signal (reception signal) that the communication counterpart transmits; a compound data generating portion 18 that generates compound data including the request information outputted from the counterpart-side transmission power request portion 17; a transmission data generating portion 19 that generates transmission data; and a transmission data combining portion 20 that combines the transmission data generated by the transmission data generating portion 19 with the compound data to output the resulting transmission data to the modulator 2.

The communication device 1 further includes: an own-side transmission power request acquiring portion 21 that acquires, from the reception data acquired by the demodulator 14, request information generated by the communication counterpart and indicating request with respect to the transmission power of the transmission signal of the communication device 1; a data format acquiring portion 22 that acquires a format of the transmission data generated by the transmission data generating portion 19; an own-side transmission power setting portion 23 that sets the transmission power of the communication device 1 based on the request information acquired by the own-side transmission power request acquiring portion 21 and the format of the transmission data acquired by the data format acquiring portion 22; and an amplification degree setting portion 24 that sets the amplification degree of the automatic amplifier 7 such that the transmission power set by the own-side transmission power setting portion 23 is achieved.

Next, descriptions will be given of the operation of each component of the communication device 1 shown in FIG. 1. In the communication device 1, first, the modulator 2 modulates transmission data (which will be described in detail later) outputted from the data combining portion 20 by a predetermined modulation method. Incidentally, before the modulation of the transmission data, error-correcting encoding (for example, concatenated encoding in which outer encoding is performed by block encoding exemplified by Reed-Solomon encoding and Hamming encoding, and inner encoding is performed by convolutional encoding exemplified by Viterbi algorithm and turbo encoding) may be performed.

A modulated signal outputted from the modulator 2 is amplified by the transmission-side amplifier 3, and inputted to the transmission-side mixer 4. The transmission-side mixer 4 outputs a signal including: a frequency component acquired by adding the frequency of a signal inputted from the transmission-side oscillator 5 to the frequency of a signal inputted from the transmission-side amplifier 3; and a frequency component acquired by subtracting the frequency of a signal inputted from the transmission-side oscillator 5 from the frequency of a signal inputted from the transmission-side amplifier 3. The transmission-side BPF 6 passes only the frequency component acquired by the addition, and filters out any other frequency components. In this way, frequency conversion (upconversion) to an RF (radio frequency) is achieved. Transmission channel change can be achieved by appropriately changing the frequency of the signal outputted from the transmission-side oscillator 5.

A signal outputted from the transmission-side BPF 6 is amplified by the automatic amplifier 7, and inputted to the antenna BPF 8. At this time, the automatic amplifier 7 performs the amplification at the amplification degree set by the amplification degree setting portion 24. A detailed description will be given later of how the amplification degree setting portion 24 sets the amplification degree.

The antenna BPF 8 filters out, from the signal inputted from the automatic amplifier 7, any frequency component (such as a noise component) that should not be included in the transmission signal, and outputs the resulting signal to the antenna 9 as a transmission signal. Then the antenna 9 radiates the inputted transmission signal into the air to wirelessly send it to the communication counterpart.

The antenna 9 also receives a reception signal wirelessly sent thereto from the communication counterpart, and outputs the reception signal to the antenna BPF 8. The antenna BPF 8 filters out, from the reception signal inputted from the antenna 9, any frequency component (such as a noise component) that should not be included in the reception signal, and outputs the resulting signal to the reception-side amplifier 10.

The reception-side amplifier 10 amplifies the inputted signal and inputs the resulting signal to the reception-side mixer 11. The reception-side mixer 11 outputs a signal including a frequency component acquired by subtracting the frequency of a signal inputted from the reception-side oscillator 12 from the frequency of the signal inputted from the reception-side amplifier 10, and a frequency component acquired by adding the frequency of the signal inputted from the reception-side oscillator 12 to the frequency of the signal inputted from the reception-side amplifier 10. The reception-side BPF 13 passes only the frequency component acquired by the subtraction and filters out any other frequency components. In this way, frequency conversion (downconversion) to an IF (intermediate frequency) is achieved. Reception channel changing can be achieved by appropriately changing the frequency of the signal outputted from the reception-side oscillator 12.

The signal outputted from the reception-side BPF 13 is inputted to the demodulator 14. The demodulator 14 demodulates the signal by using a demodulation method corresponding to the modulation method that the communication counterpart has used, and thereby acquires reception data. In a case where the communication counterpart has performed error-correcting encoding, the demodulator 14 decodes the reception data by using a decoding method corresponding to the error-correction encoding method, and thereby outputs reception data undergone the error-correcting. The communication device 1 uses the thus outputted reception data for various purposes.

The counterpart-side transmission condition judging portion 15, on the basis of the reception data acquired by the demodulator 14, judges the transmission condition of the counterpart (the condition of the transmission path from the communication counterpart to the communication device 1), to generate and output judgment information. For example, the counterpart-side transmission condition judging portion 15 makes the judgment by using a BER (bit error rate) that can be calculated incidentally when error-correction is performed with respect to the reception data. In this case, the larger the BER is (that is, the more bits are regarded erroneous), the worse the generated judgment information indicates that the counterpart transmission condition is. A temporal average value of the acquired BER may be used as the judgment information.

The counterpart-side transmission condition judging portion 15 monitors the transmission condition of the communication counterpart at all times or at predetermined time intervals, and accordingly outputs the judgment information. The accordingly outputted judgment information is then accordingly inputted to a memory 16 to be stored therein. The counterpart-side transmission power request portion 17 generates request information indicating request with respect to the transmission power of the communication counterpart on the basis of the judgment information stored in the memory 16.

For example, in a case where the counterpart-side transmission power request portion 17 generates request information based on the judgment information generated by using the BER as in the above example, if the BER value is large, the counterpart-side transmission power request portion 17 generates request information requesting the communication counterpart to increase the transmission power. On the other hand, if the BER value is so small that the reception data can be regarded as error free (for example, if, in the reception data undergone the above-described concatenated encoding, the BER value at the time of inner-code decoding is $2 \times 10^{-4}$ or smaller), the counterpart-side transmission power request portion 17 generates request information requesting the communication counterpart to reduce the transmission power. If the BER value is between the large value and the small value, the counterpart-side transmission power request portion 17 generates no request information, or, may generate request information requesting the communication counterpart to keep the transmission power as it is.

The compound data generating portion 18 generates compound data by combining request information and other data to be transmitted to the communication counterpart with each other. Then, the transmission data combining portion 20 combines the compound data with the transmission data (such as data of a moving image to be displayed on the display portion) generated by the transmission data generating portion 19, and outputs the resulting transmission data to the modulator 2.

Also, the communication counterpart, like the communication device 1, includes components corresponding to the counterpart-side transmission condition judging portion 15, the memory 16, the counterpart-side transmission power request portion 17, the compound data generating portion 18, and the transmission data combining portion 20 illustrated in FIG. 1, and generates request information indicating request with respect to the transmission power of the communication device 1, and makes the reception signal (the signal that the communication counterpart transmits) include the request information. Here, the communication counterpart does not need to include all of these components, but it is assumed that the communication counterpart at least includes a component corresponding to the counterpart-side transmission condition judging portion 15, and informs the communication device 1 of the transmission condition (for example, the judgment information, BER) of the communication device 1. In this case, the own-side transmission power request acquiring portion 21 of the communication device 1 may generate the request information based on the transmission condition informed by the communication counterpart, or the own-side transmission power setting portion 23 of the communication device 1 may control the magnitude of the transmission power of the communication device 1 based on the transmission condition informed by the communication counterpart.

The own-side transmission power request acquiring portion 21 acquires the request information generated by the communication counterpart from the reception data. Then, the thus acquired request information is inputted to the own-side transmission power setting portion 23. The data format acquiring portion 22 acquires a format (for example, data volume and compression method) of the transmission data generated by the transmission data generating portion 19, and inputs the acquired data format to the own-side transmission power setting portion 23.

The own-side transmission power setting portion 23 controls the level of the transmission power of the communication device 1 basically on the basis of the request information acquired by the own-side transmission power request acquiring portion 21. If the request information requesting the communication device 1 to increase the transmission power is inputted, the own-side transmission power setting portion 23 gives the amplification degree setting portion 24 an instruction to increase the amplification degree, to increase the own-side transmission power. In contrast, if the request information requesting the communication 1 to reduce the transmission power is inputted, the own-side transmission power setting portion 23 gives the amplification degree setting portion 24 an instruction to reduce the amplification degree.

Furthermore, the own-side transmission power setting portion 23 adjusts the transmission power of the communication device 1 on the basis of the data format. For example, in a case where the data volume of the transmission data is so large (due to a very fine image quality or a low data compression ratio) that it seems preferable to increase the transmission power to achieve reliable transmission, the transmission power is adjusted to be sufficiently higher than (to have a large margin from) the minimum required magnitude determined based on the above request information. On the other hand, in a case where the data volume of the transmission data is so small that it seems unnecessary to increase the transmission power, the transmission power is adjusted to be close to (to have a small margin from) the minimum required magnitude.

In addition, the own-side transmission power setting portion 23 is capable of controlling the above margin on the basis of the modulation method used by the modulator 2 in addition to (or, instead of) the format of the transmission data. For example, the larger a transmission rate is, the larger the margin may be. Note that, in a case where the data format and the modulation method are tied to each other such that, for example, the transmission rate is increased in proportion as the data volume of the transmission signal is larger, the adjustment may be performed based on whichever of the data format and the modulation method.

With the above configuration, the transmission power of the communication device 1 is set based on the state of the transmission signal transmitted from the communication device 1. In other words, the own-side transmission power is controlled on the basis of the condition of the transmission path from the communication device 1 to the communication counterpart. This makes it possible to feed back the condition of the transmission signal directly to the magnitude of the transmission power, and thus to accurately optimize the transmission power. As a result, it is possible to prevent interference to another communication system or prevent the communication counterpart from becoming unable to receive signals.

Likewise, by making the transmission data include the request information indicating request with respect to the transmission power of the communication counterpart, it is possible to optimize the transmission power of the communication counterpart. Thus, the transmission power can be optimized on both sides, which helps achieve reliable communication.

Furthermore, by adjusting the transmission power based on the format of the transmission data, it is possible to achieve more reliable communication. Specifically, by increasing the margin of the transmission power when the data volume is large, it is possible to effectively prevent the communication counterpart from becoming unable to receive signals.

Moreover, by judging the condition of the transmission signal based on the BER of the transmission signal, it is possible to control the transmission power based on a signal error. This makes it possible to effectively reduce errors occurring in the transmission signal received by the communication counterpart.

It should be noted that, since the communication device 1 of this example is assumed to be incorporated in the video source portion, moving image data is dealt with as an example of the transmission data, but the transmission data may be any data. For example, in a case where the communication device 1 is incorporated in the display portion, the transmission data may be an instruction (a remote controller code) inputted through a remote controller to be transmitted to the video source portion via the display portion provided with a light receiving portion, or the transmission data may be an ACK (ACKnowlegement) sent to the video source portion to acknowledge normal reception of the transmission signal, or a re-transmission request signal.

Further, it is preferable that each communication device performing communication optimize the transmission power described above; this makes it possible for each communication device to securely transmit the transmission signal and the request information, and thus helps further effectively prevent each communication device form interfering to another communication system and form becoming unable to receive signals.

However, for the sake of a simple configuration, the above optimization of the transmission power may be performed solely by one of the communication devices. In such a case, the following configuration may be adopted; that is, one communication device 1 performing communication, which optimizes the transmission power as described above, does not include the counterpart-side transmission condition judging portion 15, the memory 16, and the counterpart-side transmission power request portion 17, while the other communication device 1 performing the communication, which does not optimize the transmission power as described above (for example, optimizes the transmission power using a different method) does not include the own-side transmission power request portion 21 and the data format acquiring portion 22.

Also, the amplification degree set by the own-side transmission power setting portion 23 and the amplification degree setting portion 24 may be able to be set in a stepwise manner. For example, the amplification degree may be allowed to be set to any of the following stepwise degrees: the maximum settable amplification degree; an amplification degree smaller than the maximum settable amplification degree by 3 dB or more; and each amplification degree acquired by dividing the range between these two amplification degrees into two or more steps.

This configuration makes it possible to achieve stepwise control of the amplification degree. Furthermore, by making request information give stepwise directions in a stepwise manner (for example, directions solely on up/down with respect to the steps and on the increasing/decreasing of the transmission power), it is possible to achieve a simple configuration.

<Communication Operation>

Figure 2:
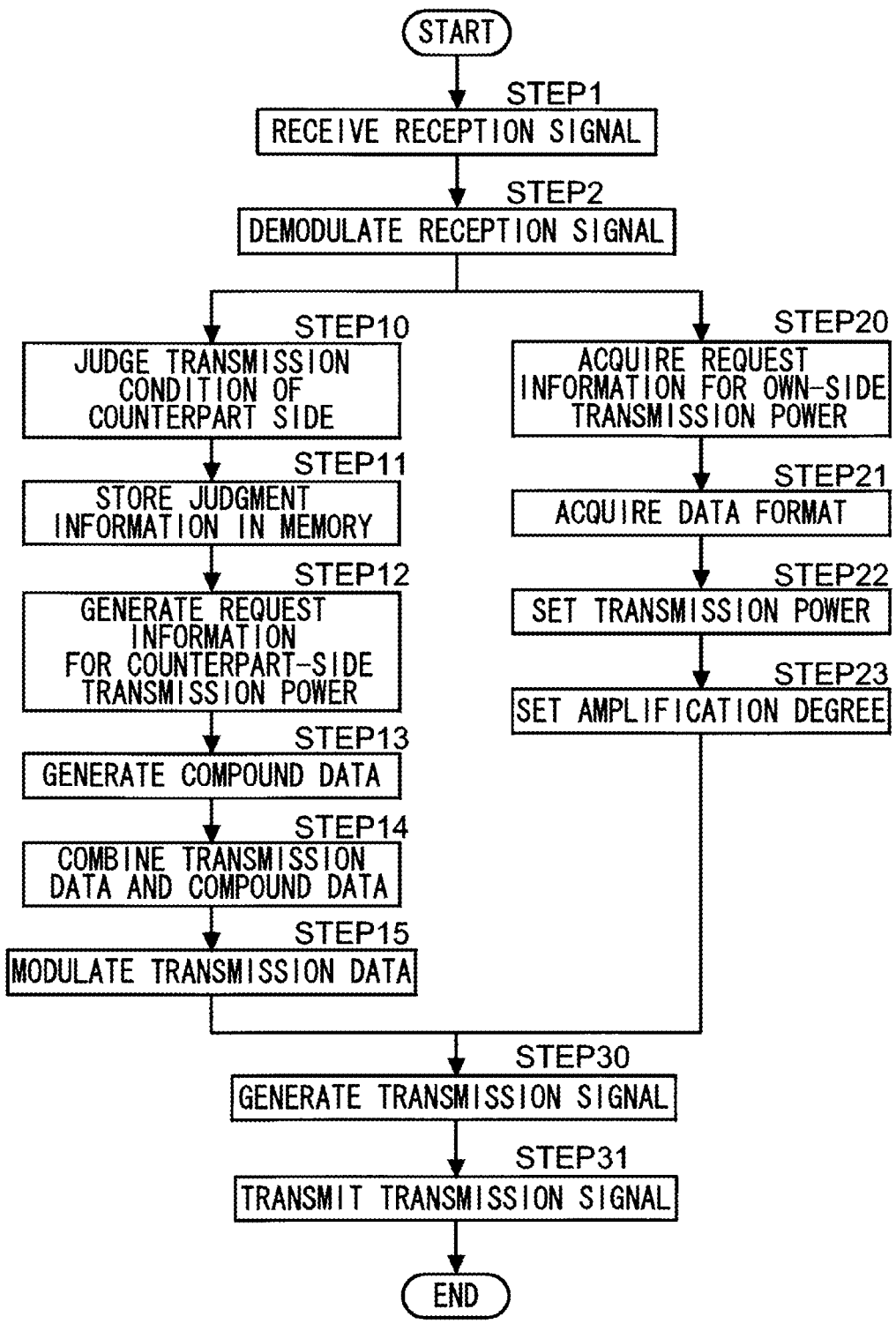
FIG. 2 A flow chart showing an example of the operation of the communication device embodying the present invention.
Figure 3:
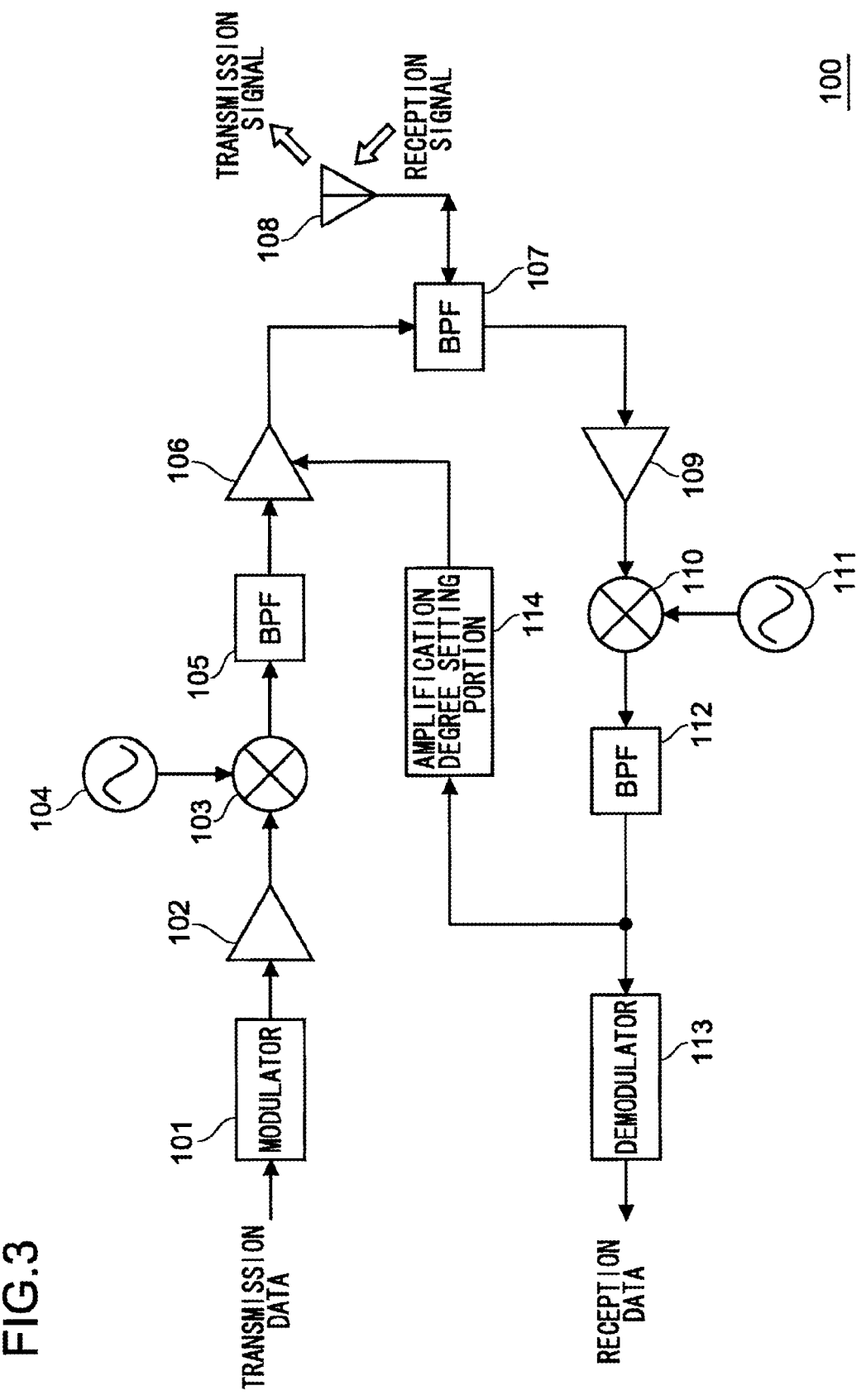
FIG. 3 A block diagram showing the configuration of a conventional communication device.

Next, a description will be given of an example of the communication operation performed by the communication device 1, with reference to FIGS. 1 and 2. FIG. 2 is a flow chart showing an example of the operation of the communication device embodying the present invention. Hereinafter, the description deals with a case where communication devices (a first communication device 1 and a second communication device 1) performing communication are each the communication device 1 shown in FIG. 1.

In the communication method of this example, prior to the communication operation shown in FIG. 2, first, communication is established. Specifically, the first communication device 1 finds the second communication device 1 as a communication counterpart, and simultaneously determines which channel to use for the communication.

First, the first communication device 1 performs carrier sense to make sure that the channel that the first communication device 1 is going to use for transmission is not used by any other communication system (that is, the channel is an unused channel). Specifically, the first communication device 1 receives a signal of a predetermined channel, and if it judges that no signal is detected (specifically, if the reception power is at a predetermined magnitude or smaller), the first communication device 1 recognizes the predetermined channel as an unused channel.

The first communication device 1 uses the recognized unused channel, and transmits a transmission signal with the maximum transmission power to increase the possibility of the second communication device receiving the transmission signal. On receiving the transmission signal, the second communication device 1 transmits an ACK to the first communication device 1 by using the predetermined channel. Then, the first communication device 1 receives and recognizes the ACK, and thereby communication is established.

When the communication is established, the first and second communication devices 1 start the communication operation shown in FIG. 2. The communication operation shown in FIG. 2 can be repeatedly performed by the first and second communication devices 1. Incidentally, in FIG. 2, the series of operation starts when the reception signal is received.

As shown in FIG. 2, the communication device 1 (representing the first and second communication devices hereinafter) receives the reception signal at the antenna 9 (STEP 1), demodulates the reception signal at the demodulator 14 to acquire reception data (STEP 2).

After acquiring the reception data in STEP 2, the communication device 1 uses the reception data to generate a signal including request information indicating request with respect to the transmission power of the communication counterpart (STEP 10 to STEP 15), and sets its own transmission power (STEP 20 to STEP 23).

To make a request with respect to the transmission power of the communication counterpart, first, the counterpart-side transmission condition judging portion 15 of the communication device 1 judges the condition of transmission from the communication counterpart to the communication device 1 by, for example, using the BER of the reception data (STEP 10). Also, judgment information generated based on the judgment is stored in the memory 16 (STEP 11). Then, the counterpart-side transmission power request portion 17 generates request information based on the judgment information stored in the memory 16 (STEP 12), and the compound data generating portion 18 generates compound data including the request information (STEP 13). Furthermore, the transmission data combining portion 20 combines the compound data with transmission data generated by the transmission data generating portion 19 (STEP 14), and the modulator 2 modulates the transmission data with which the request information is combined (STEP 15). Through this series of operation, there is generated a signal including the request information with respect to the transmission power of the communication counterpart.

On the other hand, the transmission power of the communication device 1 itself is set in the following manner. First, the own-side transmission power request acquiring portion 21 of the communication device 1 acquires request information (generated by the communication counterpart) indicating request with respect to the transmission power of the communication device 1 included in the reception data (STEP 20). The data format acquiring portion 22 of the communication device 1 acquires the format of the transmission data transmitted by the communication device 1 (STEP 21). Then, the own-side transmission power setting portion 23 sets the strength of the transmission power based on the request information acquired in STEP 20 and the data format acquired in STEP 21 (STEP 22), and the amplification degree setting portion 24 sets the amplification degree of the automatic amplifier 7 (STEP 23). Through the above series of operation, the transmission power of the communication device 1 is set.

Also, various kinds of processing are performed on the signal generated in STEP 15 and including the request information with respect to the transmission power of the communication counterpart, and thereby a transmission signal is generated (STEP 30). At this time, the automatic amplifier 7 amplifies the signal with the amplification degree set in STEP 23 to optimize the transmission power. Then, the transmission signal generated in STEP 30 is transmitted via the antenna 9 (STEP 31).

The above operation is repeatedly performed in the first and second communication devices 1. Thus, even when, for example, the transmission power at the start of the communication is maximized as in the above description, the transmission power is lowered if it does not need to be at the maximum, and thereby the transmission power is optimized.

If, after communication is established, the communication is temporarily stopped due to, for example, power supply cut or communication failure, in re-establishing and restarting the communication, transmission may be performed by using the transmission power that has been set. In this case, the request information set by the own-side transmission power request acquiring portion 21 may be stored in, for example, the memory 16, and the request information may be read out from, for example, the memory 16 to set the transmission power based on the request information when the communication is restarted. Likewise, the transmission power set by the own-side transmission power setting portion 23 and the amplification degree set by the amplification degree setting portion 24 may also be stored in the memory 16. This makes it possible to restart the communication with a preferable transmission power.

Also, in a case where the communication has been stopped for a predetermined period of time or longer, or in a case where the communication needs to be re-established, an attempt may be made to re-establish the communication with the maximum transmission power without depending on the request information stored in the memory 16 (for example, with the request information canceled). This makes it possible to increase the possibility of the communication counterpart receiving the transmission signal.

MODIFIED EXAMPLE

The operation of each of the components (such as the counterpart-side transmission condition judging portion 15, the counterpart-side transmission power request portion 17, the own-side transmission power request portion 21, the own-side transmission power setting portion 23) incorporated in the communication device 1 embodying the present invention may be performed by a control device such as a microcomputer. Further, all or part of functions achieved by such a control device may be written as a program, such that all or part of the functions are achieved by executing the program on a program executing device (such as a computer).

However, this is not meant as a limitation, and the communication device 1 shown in FIG. 1 can be achieved with hardware, or with a combination of hardware and software. In a case in which part of the communication device 1 is built with software, a block diagram showing the blocks achieved with software serves as a functional block diagram of those blocks.

Although the embodiment of the invention is described above, the scope of the invention is not limited to this embodiment, and many modifications are possible without departing from the spirit of the invention.

Industrial Applicability

The present invention is related to a communication device for transmitting signals and a communication system including the communication device, and is preferably incorporated in a display portion or a video source portion of a wireless-transmission television system.

LIST OF REFERENCE SYMBOLS 1 communication device
2 modulator
3 transmission-side amplifier
4 transmission-side mixer
5 transmission-side oscillator
6 transmission-side BPF
7 automatic amplifier
8 antenna BPF
9 antenna
10 reception-side amplifier
11 reception-side mixer
12 reception-side oscillator
13 reception-side BPF
14 demodulator
15 counterpart-side transmission condition judging portion
16 memory
17 counterpart-side transmission power request portion
18 compound data generating portion
19 transmission data generating portion
20 transmission data combining portion
21 own-side transmission power request acquiring portion
22 data format acquiring portion
23 own-side transmission power setting portion
24 amplification degree setting portion

The invention claimed is:

1. A communication system, comprising:
a first communication device for transmitting a first signal and receiving a second signal; and
a second communication device for transmitting the second signal and receiving the first signal,
wherein
the first communication device includes
a first transmission power control portion for controlling first transmission power, which is transmission power of the first signal, and
a memory for storing information for controlling the first transmission power;
the second communication device includes
a first condition judging portion for judging, by using a bit error rate, condition of the first signal, which the second communication device receives, to generate first transmission power information and
a first generating portion for generating the second signal which includes the first transmission power information;
the first transmission power control portion acquires the first transmission power information from the second signal, which is received by the first communication device, and controls the first transmission power based on said first transmission power information; and
in a case where communication between the first and second communication devices is temporarily stopped, when the communication is restarted, the first transmission power is controlled based on the information stored in the memory.

2. The communication system of claim 1,
wherein
the first transmission power control portion adjusts the first transmission power based on the condition of the first signal which is transmitted by the first communication device.

3. The communication system of claim 1,
wherein
the first transmission power information is capable of indicating a request to increase or decrease the first transmission power; and
the first transmission power control portion controls the first transmission power according to the request indicated in the first transmission power information.

4. The communication system of claim 1,
wherein
the first transmission power control portion controls the first transmission power in a predetermined stepwise manner.

5. The communication system of claim 1,
wherein
the first communication device further includes
a second condition judging portion for judging, by using the bit error rate, condition of the second signal, which the first communication device receives, and generating second transmission power information and
a second generating portion for generating the first signal which includes the second transmission power information;
the second communication device further includes a second transmission power control portion for controlling a second transmission power which is the transmission power of the second signal; and
the second transmission power control portion acquires the second transmission power information from the first signal, which is received by the second communication device, and controls the second transmission power based on said second transmission power information.

6. The communication system of claim 1, wherein the information stored in the memory is one of the first transmission power information, the first transmission power, and an amplification degree of the first signal.

7. A communication device for wirelessly transmitting a signal to a communication counterpart, the communication device comprising:
 a transmission power control portion for controlling transmission power of the signal;
 a transmission condition detecting portion for detecting transmission condition of the signal by using a bit error rate; and
 a memory for storing information for controlling the transmission power based on the transmission condition,
 wherein
 the transmission power control portion controls the transmission power based on the transmission condition, and
 in a case where communication with the communication counterpart is temporarily stopped, when the communication is restarted, the transmission power is controlled based on the information stored in the memory.

8. The communication device of claim 7, wherein the information stored in the memory is one of transmission power information generated based on the transmission condition, the transmission power of the signal, and an amplification degree of the signal.

* * * * *